Patented Oct. 10, 1944

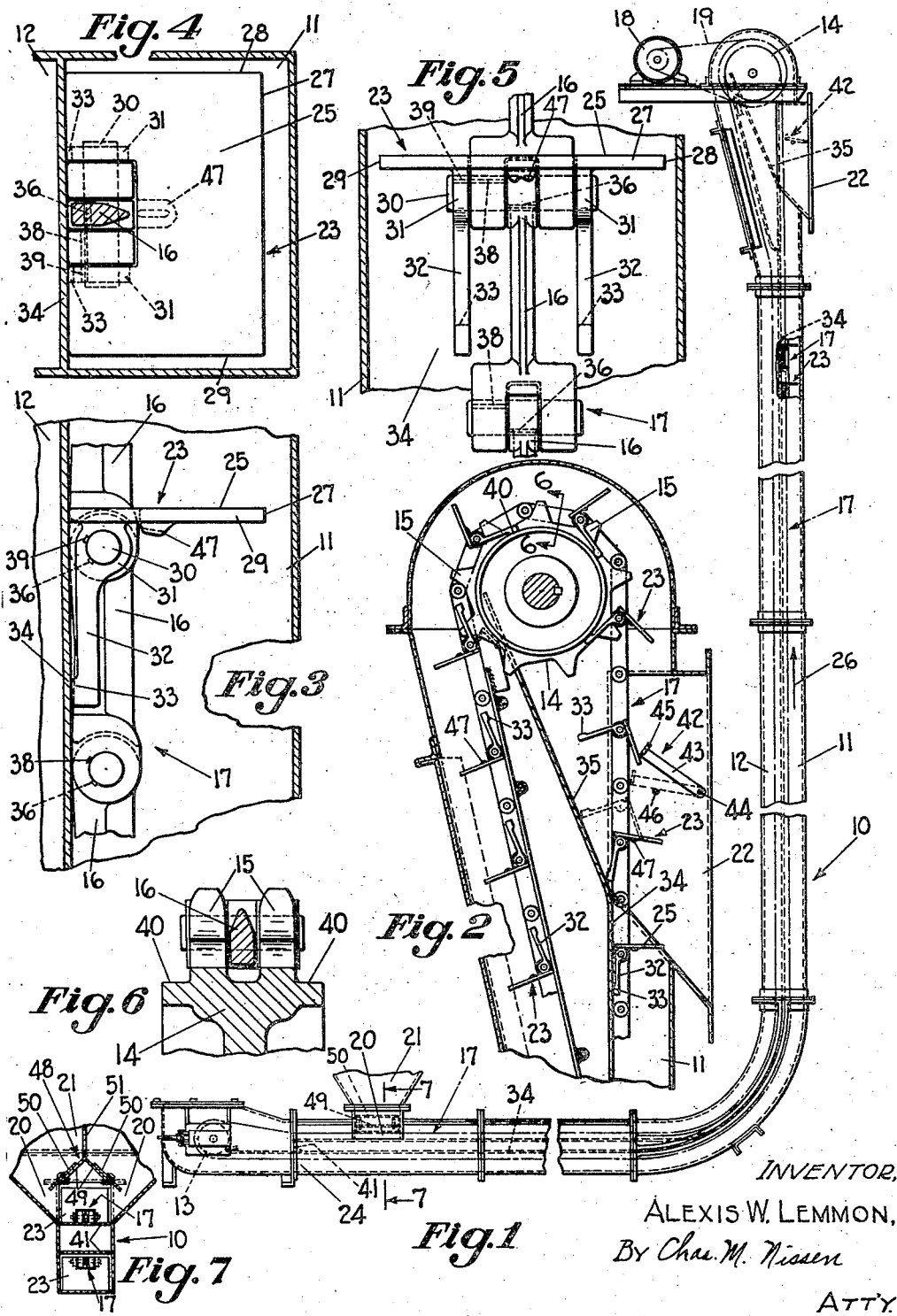

2,360,243

UNITED STATES PATENT OFFICE 2,360,243

CONVEYER

Alexis W. Lemmon, Columbus, Ohio, assignor to The Jeffrey Manufacturing Company, a corporation of Ohio Application April 11, 1940, Serial No. 329,136

9 Claims. (Cl. 198—170)

This invention relates to a conveyer particularly of the scraper type, and in the preferred embodiment thereof which is disclosed the working leg of the conveyer is of the totally enclosed type.

An object of the invention is to produce an improved and simple conveyer of the above mentioned type.

Another object of the invention is to provide a simple conveyer of the type above mentioned which will readily discharge material.

Another object of the invention is to provide a conveyor mechanism of improved and simple structure for conveying material, particularly by scraping action from one position to another position where it is discharged.

Other objects of the invention will appear hereinafter, the novel features and combinations being set forth in the appended claims.

In the accompanying drawing,

Fig. 1 is a side elevational view with parts shown in section illustrating the preferred embodiment of my invention;

Fig. 2 is an enlarged sectional view showing mechanism for discharging the material at the discharge point;

Fig. 3 is an enlarged side view of one complete link of a conveyer chain and one of the conveyer flights, in a section of the working leg of the conveyer;

Fig. 4 is a plan view of one of the flights showing the chain in section and also the working leg of the conveyer;

Fig. 5 is a front view of one of the flights and a part of the conveyer chain and the working leg of the casing which is in section;

Fig. 6 is a sectional view of the drive sprocket taken on the line 6—6 of Fig. 2, looking in the direction of the arrows; and Fig. 7 is a sectional view on the line 7—7 of Fig. 1.

Referring to the accompanying drawing, there is seen in Fig. 1 a total enclosing casing or housing 10 formed by a working leg or tube 11 and a return leg or tube 12. The casing or housing 10 is generally L-shaped as illustrated in the drawing, but it is to be understood that it may take various shapes.

At the foot of the casing 10 there is an adjustable foot sprocket or wheel 13 and at the head shaft 114 carrying a head thereof is a head sprocket 14 which is provided with a pair of spaced sprocket teeth 15 between which the links 16 of an endless conveyer chain 17 travel, said chain 17 forming a draft means of the conveying mechanism and extending between the sprockets 13 and 14.

The head sprocket 14 is driven from a motor 18 by chain and sprocket drive mechanism 19. Material is fed into the feed section of said casing or housing 10 by way of openings 20, 20 which permit material to be fed from hopper 21 laterally into the path of the conveying mechanism.

A ridged partition or roof 48 in the feed hopper protects the conveyer mechanism from the weight of the material in said hopper, thereby reducing the wear on the chain 17 and casing 10. To each sloping side 49 of ridged roof 48 is adjustably fixed a meting plate 50 adjustable to vary the size of the adjacent feed opening 20 to permit a predetermined variable amount of material to be fed laterally into the path of the conveying mechanism to each side thereof, as shown by referring to Fig. 7.

In the preferred embodiment, I construct the hopper 21 with a vertical partition 51 extending from the ridged roof 48 to the top of said hopper, and in conjunction with meting plates 50 permit different materials to be handled at the same time or at different times. That is, a different material in any desired proportions, may be fed to each side of said vertical partition 41. Of course, similar materials may be fed to both sides of said hopper. The ridged roof 48 and the parts associated therewith including the meting plates 50 are disclosed and claimed in my co-pending application, Serial No. 404,107, filed July 26, 1941, and issued January 18, 1944, as Patent No. 2,339,491.

To provide simple means to convey material received at the foot end of said casing or housing 10 and discharge it to opening 22, which simple means also will insure a complete discharging of the material while effecting an efficient movement thereof through the working leg 11 of said casing 10, I provide flights 23 which preferably substantially fill the working leg 11 between the inlet opening 24 forming one extremity thereof and a discharge opening 22 forming the other extremity thereof. The flights 23 consequently act to convey material along the interior surface of the working leg 11 of the casing 10 with the forward or working face 25 supporting or pushing the material being conveyed as the chain 17 moves through the working leg 11 in the direction of the arrow 26 or, in other words, moves to convey material from the inlet opening 24 toward the discharge opening 22. For many materials the flights 23 need not be solid but may be perforated or generally open, but it is a desirable feature to have one or more peripheral edges such as one or more of the edges 27, 28 and 29 closely adjacent the interior surface of the working leg 11 so that the material being conveyed cannot freely pass between said peripheral edges 27, 28 or 29, or one or more of them and the adjacent interior surface of the working leg 11 of casing 10.

The flights 23 while moving in an upward direction, for example, as while moving through the upright portion of the working leg 11 will convey the material largely independently of the scraping action between the periphery thereof and the interior surface of said leg 11, but even here there is a certain amount of scraping conveying action by the cooperative action between the interior surface of said working leg 11 and the periphery of each flight 23. It is evident that in the construction illustrated the flights 23 would tend to swing to a non-conveying position under the influence of the material being conveyed unless mechanism were provided to prevent this.

During the travel of each flight 23 from the inlet opening 24 to the discharge opening 22, it is of course essential to maintain each flight 23 in a material conveying position, but it is desirable to permit it to swing to a non-conveying or material discharge position adjacent the discharge opening 22, and this action is provided by cooperating mechanism now to be described.

As clearly illustrated in Figs. 3, 4 and 5 of the drawing, the chain links 16 are pivotally attached together by pivot pins 30. Flights 23 are also pivoted on each pin 30 or alternate pins 30, as desired, as by means of a pair of bosses 31, 31 to which are attached trailing arms 32, 32 having sliding bearing surfaces 33, 33, which bearing surfaces 33, 33 are adapted to slide along stationary guide means 34 over which the working run of chain 17 also slides and which maintain the working face 25 of each flight 23 substantially at right angles to the direction of travel of the chain 17 though said face may make either an acute or obtuse angle with respect thereto. In the preferred construction the guide means 34 is nothing more or less than a partition separating the return leg 12 from the working leg 11 of casing 10, but if desired wear strips may be added to form said guide means.

Adjacent the discharge opening 22, however, the guide means 34 are extended at 35 to provide for the swinging of the flights 23 to material discharging position adjacent said discharge opening 22. On the under side of working face 25 of flight 23 is formed an integral lug 47 which limits the downward swing of said flight by coming in contact with a chain link 16. It may be further pointed out that the pivot pins 30 are held in position by means of an integrally forming lock key 36 which extends into a recess formed in the male member of each link 16, which recess may be aligned with similar recesses 38 in the female end of each link 16 only when adjacent links 16 are out of alignment and, for example, are bent to form an angle of substantially 90°. Flight bosses 31 are similarly recessed at 39 to permit free insertion and removal of said pins 30.

It may additionally be pointed out that the head sprocket 14 is preferably provided with flanges 40, 40 adapted to receive the trailing arms 32 as the chain 17 travels around said sprocket 14.

In the operation of the device the motor 18 will drive the conveyer chain 17 through the drive mechanism 19 so that the said chain 17 travels in the direction of the arrow 26. Material to be conveyed is delivered by the hopper 21 through the openings 20 and is conveyed rearwardly a short distance by the return run of the conveyer mechanism until it drops over the double partition seen at 41 formed in the horizontal section where the material is caught by the working run of the conveyor 17 and moved into the opening 24 of the working leg or tube 11. The material is then conveyed along the horizontal portion of said working leg or tube 11 by the flights 23 which are connected at desired intervals to pivot pins 30.

The flights 23 are maintained in a working or material moving position in spite of the influence on them by the material which tends to move them to a non-working or non-conveying position by virtue of the cooperation between the trailing arms 32 and the stationary guide means 34 which in the preferred embodiment are merely interior surfaces of the working leg 11 of casing 10.

During the movement of the material through the vertical or upward portion of the working leg 11, a considerable portion of said material will be carried independently of the scraping action between the flights 23 and the interior surface of said working leg 11, but this scraping action will still take place to some extent. If the conveyer is entirely horizontal no such carrying action will take place. As the material reaches the discharge opening 22 there will be a natural tendency for it to spill out and this will be appreciably enhanced and made substantially complete so as to avoid any appreciable carryover by virtue of the extension guide means 35 which permits the flights to assume a non-material carrying position. When handling certain material there will be a tendency of the material to cling and not discharge freely from the working faces 25 of the flights 23 after said flights have assumed a discharge or non-conveying position. In such installations a flight wiper or scraper 42 will be positioned in the discharge opening 22 above the point of maximum tilt of flights 23 to scrape the faces thereof and dislodge any adhering material. The scraper 42 is U-shaped, and the outer ends of its arms 43 are hingedly or pivotally fixed to the casing 10 by the pivot pins or bolts 44. The cross piece 45, which is the scraper proper, is fixed to or is integral with the arms 43 and therewith form the U-shaped scraper 42. A stop 46 is fixed to each side of casing 10 and projects inwardly a sufficient distance to limit the pivotal movement of the scraper 42. When the arms 43 of scraper 42 are seated on the stops 46 the cross piece 45 is so positioned as to contact the working faces 25 of flights 23 subsequent to their assuming maximum tilt and as the chain 17 with the flights 23 move upwardly past the scraper 42, the cross piece 45 by virtue of its contact with working faces 25 will drag across said faces dislodging any material thereon. The scraper will be lifted from its stops 46, being rotated on its pivots 44 as each flight 23 moves upwardly past said scraper which will seat itself on said stops after the passing of each flight. It will be understood that the wiper or scraper 42 will be used only when flights 23 are handling material of an adhering nature.

Should any flight 23 fail to swing to a discharging position before reaching scraper 42, said scraper will act not only to scrape material from it but also to swing it into said discharging position.

It is evident that as each flight is pivoted along an axis adjacent its inner edge, the outer edge thereof will move downward as said flight assumes its discharging position, whereby the material will move over said flight away from the chain 17 and toward the discharge opening 22.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A pusher type conveyer for granular material, comprising a substantially entirely enclosing upwardly extending conveyer casing provided with spaced apart inlet and discharge openings, draft mechanism extending through said casing, means for moving said draft mechanism to convey material from said inlet opening toward said discharge opening, substantially flat material conveying flights extending substantially at right angles to said draft mechanism and pivotally attached to said draft mechanism and having a peripheral edge closely adjacent the interior surface of said casing so that the conveyed material cannot freely pass between said peripheral edge and said interior surface and constructed so that material on said flights has sliding contact over substantially the entire periphery of the interior of said casing, and cooperating mechanism adjacent said discharge opening controlling the position of the flights thereby providing for pivotal movement of said flights with their outer edges below their inner edges as they reach said discharge position.

2. An elevator comprising a casing including a substantially entirely closed rising leg having an inlet and an outlet above the inlet; a descending leg; and a conveyer element comprising an endless chain mounted to move longitudinally of the casing, a plurality of conveyer flights pivoted on the chain and each approximately fitting the cross-section of the rising leg, and depending arms rigidly secured to the flights and adapted with their free ends to engage the rear wall of the rising leg of the conveyer casing, said wall being offset back adjacent the level of the discharge opening to permit the arms to swing and thus permit the flights to successively drop to a discharging position.

3. An elevator according to claim 2 in which there is provided a guide element engageable by the depending arms of the conveyer flights to tilt the flights back towards the horizontal position as they pass to the descending leg.

4. An elevator according to claim 2 in which the endless chain passes over a driving sprocket at the upper end of the casing and there is provided a guide element engageable by the depending arms of the conveyer flights to tilt the flights back towards the horizontal position as they pass to the descending leg, the said guide element being substantially concentric with the sprocket wheel.

5. An elevator according to claim 2 in which the endless chain passes over a driving sprocket at the upper end of the casing and there is provided a guide element engageable by the depending arms of the conveyer flights to tilt the flights back towards the horizontal position as they pass to the descending leg, the said guide element being substantially concentric with the sprocket wheel and secured thereto.

6. A pusher type elevator comprising a casing including a substantially entirely closed substantially upright rising leg having an inlet and an outlet above the inlet; a descending leg; and a conveyer element comprising an endless chain mounted to move longitudinally of the casing, a plurality of conveyer flights pivoted on the chain, and means carried by the flights engaging the rear wall of said rising leg to maintain the flights in substantially horizontal position when passing up the rising leg, said wall being offset rearwardly adjacent the level of the discharge opening to enable the wall engaging means to swing and thus the flights to tilt downwardly to a discharging position when the outlet is reached.

7. A conveyer including a casing having an upwardly extending substantially entirely enclosing leg and an outlet, draft mechanism in said casing comprising an endless chain mounted to move longitudinally of the leg, a head sprocket for said draft mechanism, a plurality of substantially flat conveyer flights pivoted on the chain and extending substantially at right angles thereto, each flight approximately fitting the cross-section of the leg, and movable means positioned below said head sprocket for engaging the flights adjacent the outlet to aid the discharge of material.

8. A conveyer including a casing having an enclosing upwardly extending working leg leading to a discharge opening, a head sprocket above said discharge opening, endless conveyer draft means adapted to travel through said leg and over said head sprocket, a substantially flat material moving flight extending substantially at right angles to said conveyer draft means and pivoted to said draft means and constructed so that its outer edge scrapes material over the outer casing wall, and cooperating mechanism adjacent said discharge opening controlling the position of the flight and thereby providing for pivotal movement of said flight with its outer edge below its inner edge as it reaches said discharge position.

9. An elevator comprising a casing including a substantially entirely closed rising leg having an inlet and an outlet above the inlet; a descending leg; and a conveyer element comprising an endless chain mounted to move longitudinally of the casing, a plurality of conveyer flights pivoted on the chain, and depending arms rigidly secured to the flights and adapted with their free ends to engage the rear wall of the rising leg of the conveyer casing, said wall being offset back adjacent the level of the discharge opening to permit the arms to swing and thus permit the flights to successively drop to a discharging position.

ALEXIS W. LEMMON.